(12) United States Patent
Tan

(10) Patent No.: US 12,003,164 B2
(45) Date of Patent: Jun. 4, 2024

(54) HOUSING FOR AN ELECTRICAL MACHINE, ELECTRICAL MACHINE, AND VEHICLE WITH AN ELECTRICAL MACHINE

(71) Applicant: Valeo Siemens eAutomotive Germany GmbH, Erlangen (DE)

(72) Inventor: Kae Shyuan Tan, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 328 days.

(21) Appl. No.: 17/478,059

(22) Filed: Sep. 17, 2021

(65) Prior Publication Data

US 2022/0094239 A1 Mar. 24, 2022

(30) Foreign Application Priority Data

Sep. 18, 2020 (DE) ...................... 10 2020 124 436.3

(51) Int. Cl.
*H02K 5/04* (2006.01)
*H02K 5/10* (2006.01)
*H02K 5/22* (2006.01)

(52) U.S. Cl.
CPC ............... *H02K 5/225* (2013.01); *H02K 5/04* (2013.01); *H02K 5/10* (2013.01)

(58) Field of Classification Search
CPC ............... H02K 5/04; H02K 5/15; H02K 5/26
See application file for complete search history.

(56) References Cited

FOREIGN PATENT DOCUMENTS

DE 102016221681 A1 5/2018
WO 2019208244 A1 10/2019

OTHER PUBLICATIONS

Erasmus Bode; "Konstruktionsatlas: Werkstoffgerechtes Konstruieren;" 6th Edition, Wiesbaden: Springer, 1996; pp. 216-220; ISBN 978-3-663-16321-3 (5 pages).
German Search Report issued in corresponding German Application No. 10 2020 124 436.3, dated Jun. 30, 2021 (8 pages).

*Primary Examiner* — Ramon M Barrera
(74) *Attorney, Agent, or Firm* — Osha Bergman Watanabe & Burton LLP

(57) ABSTRACT

Housing (1) for an electrical machine, which has at least one connector (2) arranged spaced apart from an outer face (6) of the housing (1), for screw fixing of the housing (1), and at least one rib (5, 8) which connects together a contact face (3) of the connector (2) and the outer face (6) of the housing (1), wherein the outer face (6) of the housing (1) has a recess (9, 10) in an extension of the rib (5, 8). In addition, an associated electrical machine and a vehicle with such an electrical machine are described.

9 Claims, 5 Drawing Sheets

IV-IV

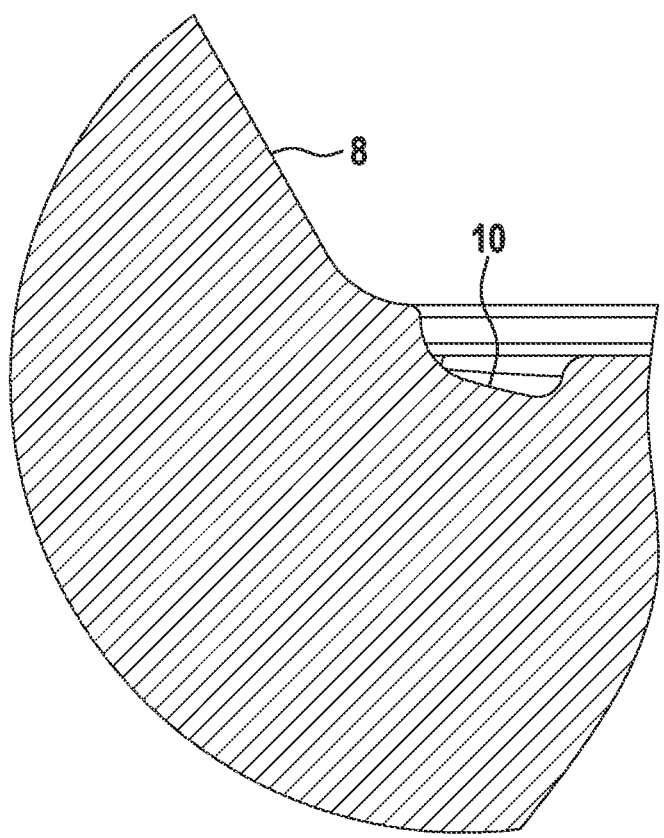

Figure 1:
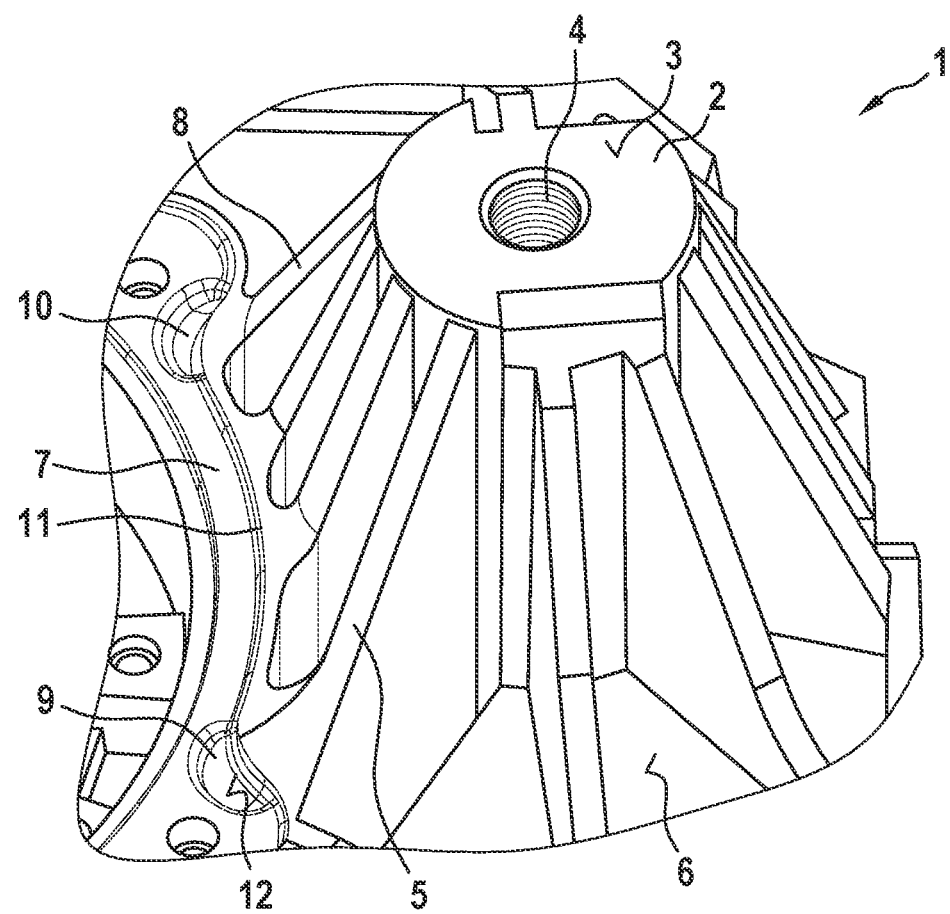

HOUSING FOR AN ELECTRICAL MACHINE, ELECTRICAL MACHINE, AND VEHICLE WITH AN ELECTRICAL MACHINE

The invention concerns a housing for an electrical machine, which has at least one connector arranged spaced apart from an outer surface of the housing, for screw fixing of the housing.

Electrical machines, which may be configured either as an electric motor or as a generator, are used to an increasing extent for driving vehicles. The housing is usually attached to a vehicle structure, e.g. to a vehicle chassis or a vehicle body. The fixing may take place at two or more points. For this, the housing has a connector which may have an internal thread so that the housing can be screwed to the vehicle structure. The fixing of the housing must be designed such that it withstands the forces, impacts and vibrations occurring during operation of the vehicle.

The housing has a rib which is arranged between a contact face of the connector and the outer face of the housing, and connects together the connector and the outer face.

With this fixing, in which the connector is spaced apart from the outer face of the housing, high stress concentrations can however occur in the region of the rib.

The invention is therefore based on the object of specifying a housing for an electrical machine in which stress concentrations in the region of the rib are reduced.

To achieve this object, a housing is provided for an electrical machine, which has at least one connector arranged spaced apart from an outer face of the housing, for screw fixing of the housing, and at least one rib which connects together a contact face of the connector and the outer face of the housing, wherein the outer face of the housing has a recess in an extension of the rib.

According to the invention, it has surprisingly been found that providing the recess allows a significant reduction in stress concentrations in the region of the rib, in particular between the rib and the outer face of the housing. It is assumed that the active forces are distributed over a greater region by the recess provided according to the invention, and stress concentrations are therefore avoided. By reducing the stress concentrations, other measures associated with disadvantages, such as for example the addition of material, may be omitted. The housing according to the invention thus has a lower mass in comparison with a conventional housing.

According to an embodiment of the invention, the recess is rounded. The recess thus has no edges or corners, but instead the recess is curved. The rounded form of the recess also contributes to reducing stress concentrations.

According to an embodiment of the invention, the recess has an at least approximately constant depth. Accordingly, the distance between the outer face of the housing and the surface formed by the recess is constant, Preferably, the recess runs parallel to and offset in the direction of the housing interior with respect to the outer face of the housing. Alternatively, the recess may also be formed such that the surface formed by the recess is sloping or curved.

In the context of the invention, it may also be provided that an edge formed between the outer face of the housing and the recess is rounded. Such a rounded transition also contributes to reducing stress concentrations. Similarly, a transition between a vertical face of the recess and the base surface of the recess may be rounded.

A variant of the invention proposes that several ribs are formed, distributed around the connector in the circumferential direction. For example, three, four, eight or ten ribs may be provided in the circumferential direction. The ribs support the connector, which is spaced apart from the outer face of the housing, so that forces, moments and other loads, such as vibrations and impacts occurring during operation, can be absorbed.

It may also be provided that a rib is formed wider in the direction towards the recess. The rib then runs out in the region of its foot, in the vicinity of the recess. The widening rib distributes the forces over a larger area and prevents stress concentrations.

In the housing according to the invention, the recess may be covered by an end shield. Accordingly, the housing may be configured such that the recess, which serves to reduce stress concentrations, is covered and not visible in mounted state.

It is also possible that the recess is arranged in a sealing region of the end shield. When the end shield is mounted, the recess is covered by a seal and the end shield, and not visible.

An embodiment of the invention provides that the housing has several such recesses. One or more recesses may be arranged in the vicinity of a threaded hole which serves for fixing the end shield.

In addition, the invention concerns an electrical machine which is configured as an electric motor or a generator, and has a housing of the type described.

The invention also concerns a vehicle which has an electrical machine with a housing of the described type, configured for driving the vehicle.

Figure 2:
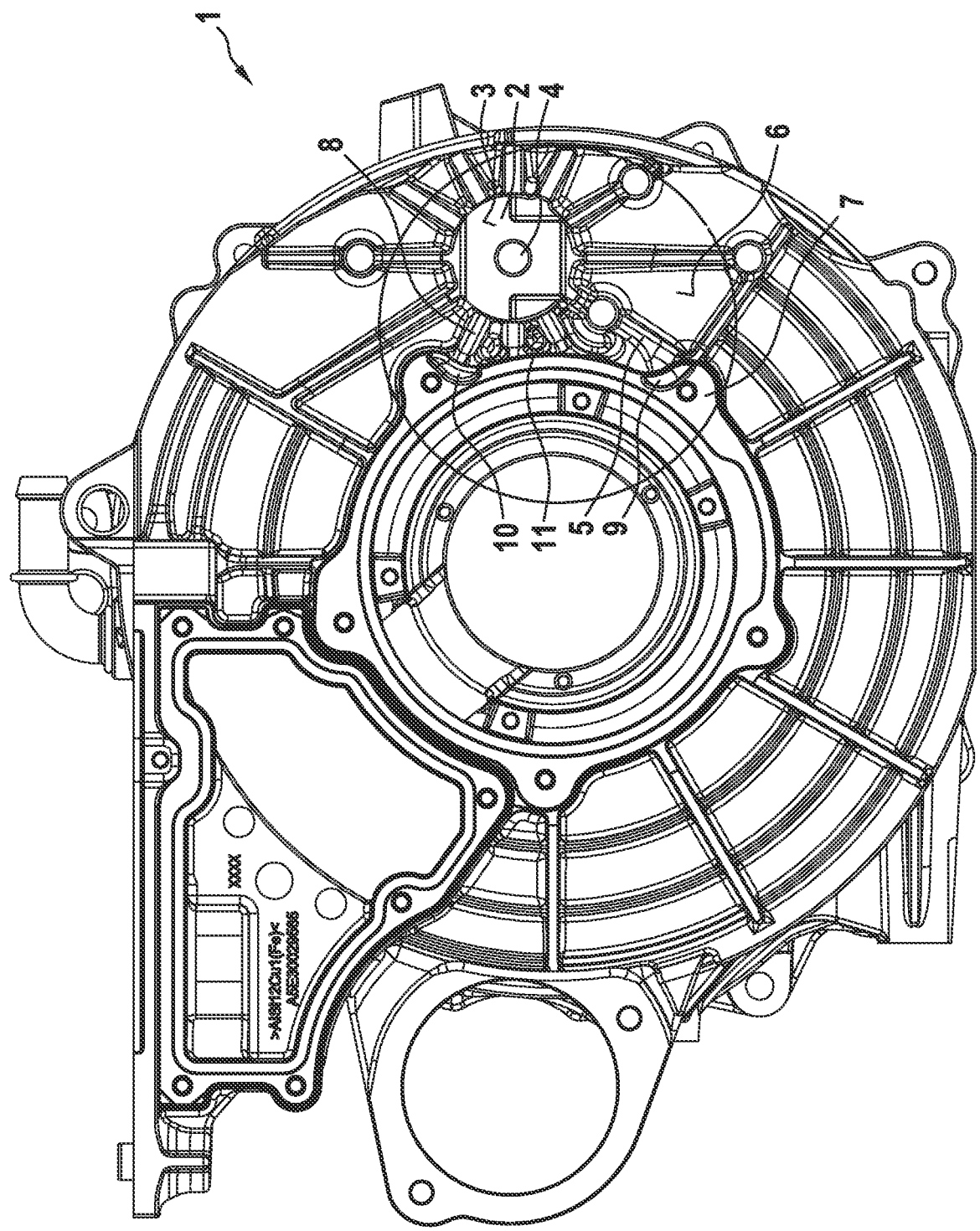
Figure 3:
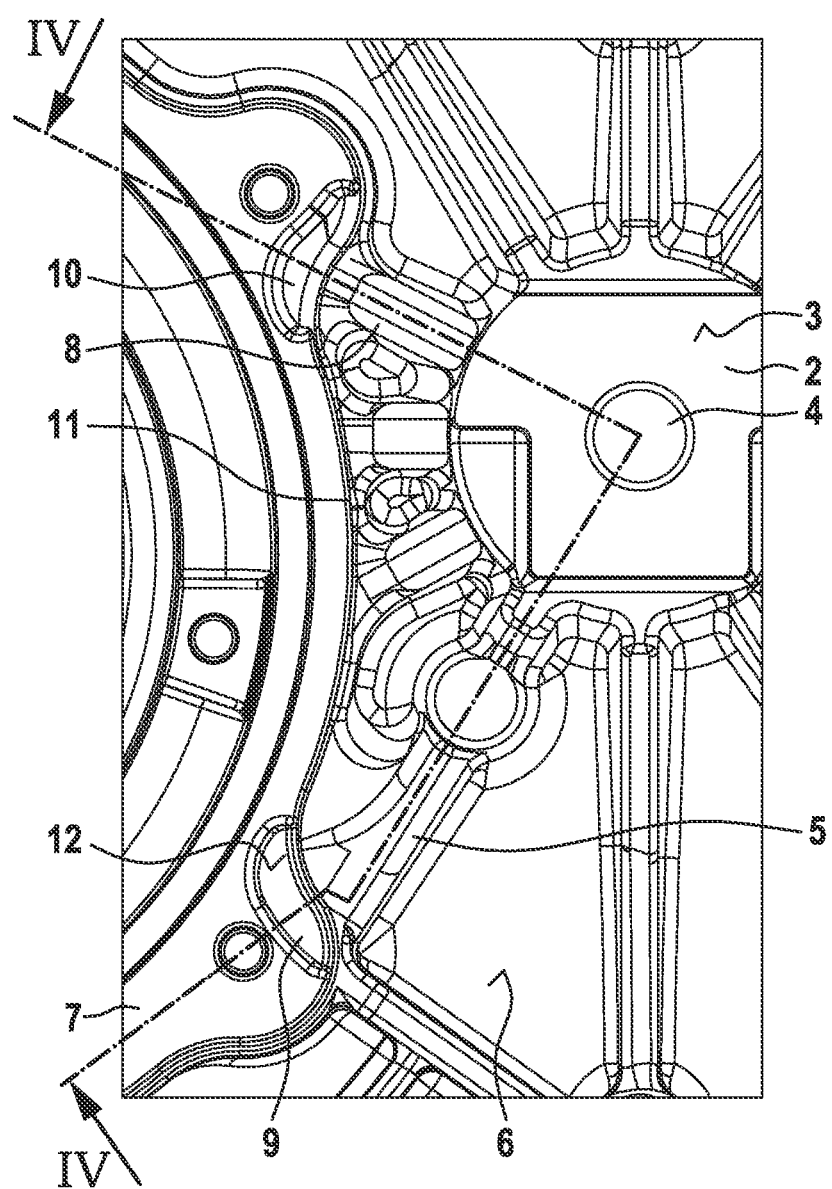
Figure 4:
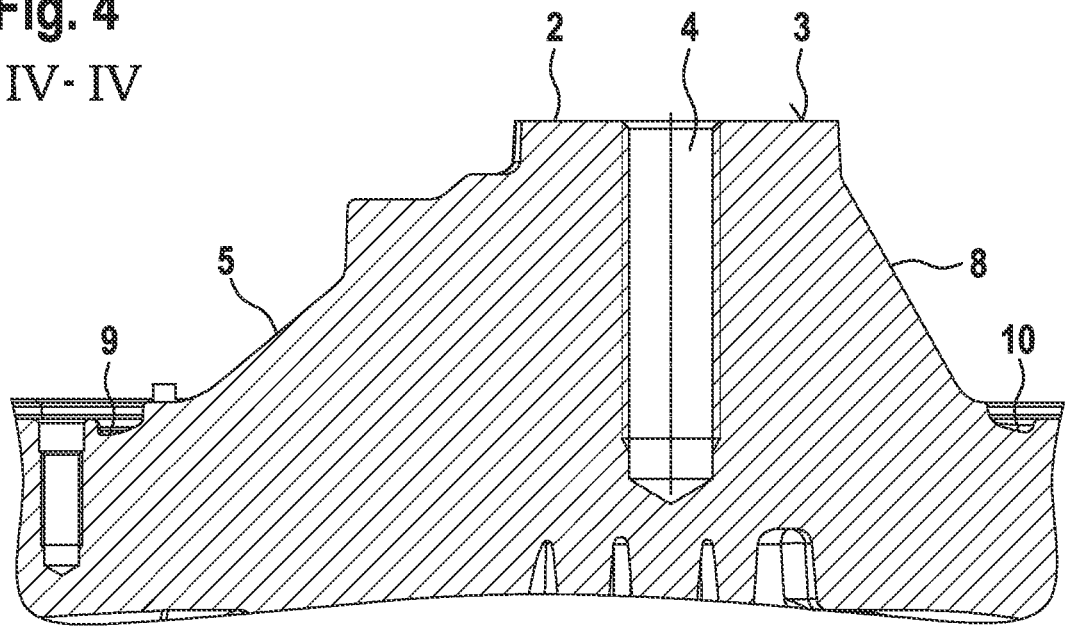
Figure 5:
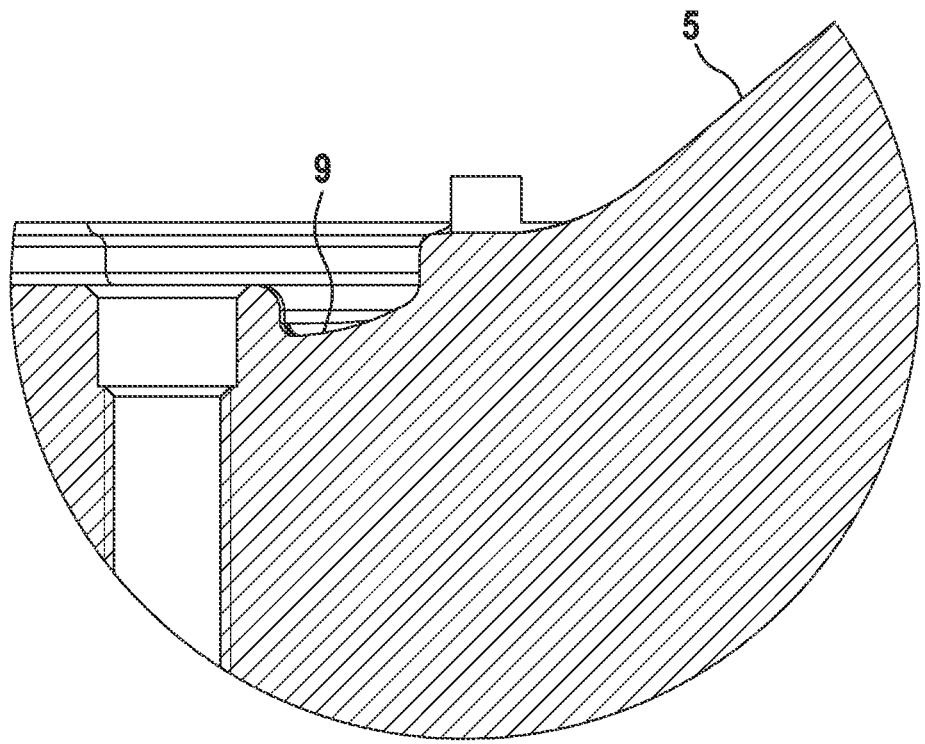

The invention will now be explained in more detail on the basis of an exemplary embodiment and with reference to the attached drawings. These are schematic illustrations and show:

FIG. 1 a perspective view of a housing according to the invention in the region of a connector for screw fixing;

FIG. 2 the housing according to the invention in an axial view;

FIG. 3 an enlarged extract of the view shown in FIG. 2;

FIG. 4 a section along line IV-IV of FIG. 3;

FIG. 5 an enlarged detail of FIG. 4 in the region of a recess; and

FIG. 6 an enlarged detail of FIG. 4 in the region of a further recess.

FIG. 1 is a perspective view and shows a detail of a housing 1 for an electrical machine. The housing 1 has the basic shape of a cylinder. To attach the housing 1, it has a connector 2 which is provided for screw fixing of the housing 1. The connector 2 has a substantially circular face 3 which is provided with an internal thread 4. The housing 1 can be attached to another component, for example the body of a vehicle, or a bracket or similar, by means of a screw which is screwed into the internal thread 4. The housing 1 has at least two such connectors with which it can be screw-mounted.

In the perspective view of FIG. 1, it is clear that several ribs 5, which are distributed in the circumferential direction, extend from the connector 2 and connect the connector 2 to an outer face 6 of the housing 1. The connector 2 is thus spaced apart from the outer face 6 of the housing 1. The individual ribs 5 have an at least approximately triangular base form. Since the connector 2 is spaced apart from the outer face 6, the internal thread 4 is situated completely in the volume enclosed by the rib 5, i.e. outside the outer face 6 of the housing 1.

FIG. 1 shows that a sealing region 7 with a circumferential groove adjoins the left side of the rib 5. The ribs 5, which have a specific width or wall thickness, are widened at the lower end, i.e. in the vicinity of the outer face 6 of the housing 1 or in the vicinity of the sealing region 7.

The rib 5 shown in the front part of FIG. 1, and a rib 8 lying further behind this, extend up to the sealing region 7. In the extension of the ribs 5, 8, the outer face 6 of the housing—or more precisely the sealing region 7—has a respective recess 9, 10. In the exemplary embodiment shown, the two recesses 9, 10 are delimited by an outer edge 11 of the groove of the sealing region 7. The two recesses 9, 10 have a kidney-shaped, rounded base form in the sealing region 7. Surprisingly, it has been found that providing the recesses 9, 10 can substantially reduce stress concentrations at the foot of the ribs 5, 8. During operation, i.e. in mounted state of the housing and the electric motor, substantial forces, moments in the form of impacts, vibration and similar are transmitted from the body or another bracket via the ribs 5, 8 to the housing 1 via the connector 2. The mounting and support of the housing 1 must be designed such that these loads can be permanently tolerated. The recesses 9, 10 cause a desired reduction in stress concentrations by improved distribution of the loads, so that there is no need to add additional material in the heavily loaded region.

FIG. 1 shows that an edge formed between the outer face 6 of the housing 1 and the recess 9, 10 is rounded. It is also evident that the transition between a vertical portion of the recesses 9, 10 to a base surface 12 is rounded. The base surface 12 may be formed either parallel to the outer face 6 of the housing 1, i.e. flat, or also sloping relative thereto, or it may have a curved contour.

FIG. 2 is an axial view of the housing 1. The connector 2 is on the right-hand side in the illustration of FIG. 2. It is clear that the ribs extend outward in a star pattern from the connector 2. The recesses 9, 10 are situated inside the sealing region 7 for an end shield (not shown) which closes the housing 1 in the axial direction and is provided with a bearing for mounting a shaft of the electrical machine.

FIG. 3 shows a detail of FIG. 2 in the region of the recesses 9, 10 in enlarged scale. The recesses 9, 10 extend only over part of the groove of the sealing region 7 so as not to adversely affect the function of sealing the end shield.

FIG. 4 shows a section extending from an end of the line IV to the internal thread 4 of the connector 2, and from there to the other end of the line IV. The section plane intersects both recesses 9, 10. FIGS. 5 and 6 each show an enlarged detail of FIG. 4, wherein FIG. 5 shows a section in the region of the recess 9 and FIG. 6 a section in the region of the recess 10. The sectional illustrations show the profile of the recesses 9, 10. These run sloping and rising from outside to inside, i.e. towards the connector 2.

The housing 1 of the exemplary embodiment shown is made of an aluminium alloy in the diecasting process.

The invention claimed is:

1. A housing for an electrical machine, which has at least one connector arranged spaced apart from an outer face of the housing, for screw fixing of the housing, and at least one rib which connects together a contact face of the connector and the outer face of the housing, wherein the outer face of the housing has a recess in an extension of the rib, wherein the recess is covered by an end shield.

2. The housing according to claim 1, wherein the recess is rounded.

3. The housing according to claim 1, wherein the recess has at least an approximately constant depth.

4. The housing according to claim 1, wherein an edge formed between the outer face of the housing and the recess is rounded.

5. The housing according to claim 1, wherein several ribs are formed, distributed around the connector in the circumferential direction.

6. The housing according to claim 1, wherein a rib is formed wider in the direction towards the recess.

7. The housing according to claim 1, wherein the recess is arranged in a sealing region of the end shield.

8. An electrical machine configured as a motor or generator, with a housing according to claim 1.

9. A vehicle comprising at least one electrical machine according to claim 8, configured for driving the vehicle.

\* \* \* \* \*